United States Patent [19]

Kuge

[11] Patent Number: 4,519,687
[45] Date of Patent: May 28, 1985

[54] CAMERA WITH VERTICALLY ORIENTED FILM ADVANCE

[75] Inventor: Takao Kuge, Hachioji, Japan

[73] Assignee: Konishiroku Photo Industry Co., Ltd., Tokyo, Japan

[21] Appl. No.: 532,180

[22] Filed: Sep. 14, 1983

[30] Foreign Application Priority Data

Sep. 21, 1982 [JP] Japan .................. 57-143658

[51] Int. Cl.³ .............................................. G03B 17/02
[52] U.S. Cl. .................. 354/202; 354/149.11; 354/288
[58] Field of Search .............. 354/145.1, 149.11, 202, 354/212, 219, 288, 354; 352/72, 78 R

[56] References Cited

U.S. PATENT DOCUMENTS

| 3,324,778 | 6/1967 | Everett | 354/212 |
| 3,763,752 | 10/1973 | Ackerman | 354/149.11 |
| 4,041,508 | 8/1977 | Edamoto et al. | 354/149.11 |
| 4,148,573 | 4/1979 | Yamanaka | 354/149.11 |
| 4,171,887 | 10/1979 | Hayata | 354/149.11 |
| 4,176,930 | 12/1979 | Imura | 354/149.11 |

Primary Examiner—A. A. Mathews
Attorney, Agent, or Firm—Jordan B. Bierman

[57] ABSTRACT

A camera having a camera body with width longer than the height. A camera lens is located at almost the middle of the camera body both widthwise and heightwise. A film supply chamber and a film take-up chamber are arranged along a vertical axis in the direction of the height of the camera. A plurality of elements including a strobe flash, a viewfinder, a battery, a capacitor and a photometric portion for automatic focusing are arranged for balance on both sides of the lens in the widthwise direction of the camera body.

7 Claims, 2 Drawing Figures

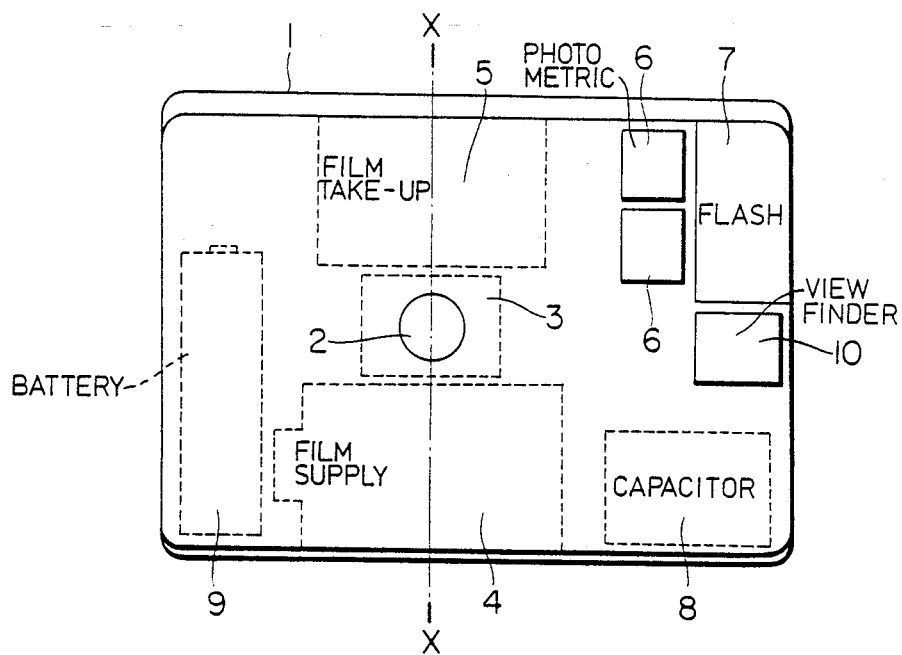
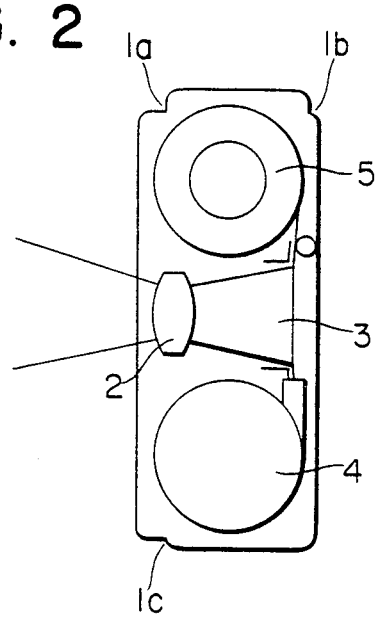

CAMERA WITH VERTICALLY ORIENTED FILM ADVANCE

BACKGROUND OF THE INVENTION

The present invention relates to the improvement of a small-sized hand camera.

As a small-sized camera, the ones that take roll films with a width of 35 mm are still used widely. A roll of film is stored in a film cartridge standardized by JIS K 7528, ISO 1007 and others which is loaded in a film-supply chamber of a small-sized camera. A film loaded in a small-sized camera is exposed to the light in the exposure frame and then is taken up one frame at a time into a film-take-up section. Such small-sized camera, as widely known, has a structure in which a film-supply chamber is located at the right side of the camera when viewed from the front and a film-take-up chamber is located at the left side thus the film is advanced horizontally. As an exposure frame, the full size frame with a size of 24×36 mm is popular and it gives an oblong picture for photographing which gives to a photographer the impression of stability, thus the camera satisfies the ordinary photographing conditions. A small-sized camera with a half size frame of 24×18 mm, on the other hand, gives a picture which is long in its vertical direction and which does not give an impression of stability to a photographer, because it takes over the structural arrangement of a small-sized camera with a full size frame as it is. Photographers, therefore, have frequently been compelled to photograph holding a camera in an unstable position in order to get an oblong picture. According to the statistics of the photofinishing laboratories and others, the number of frames in half size for oblong picture is larger than that for vertical picture, which indicates that photographers usually photograph seeking an oblong picture.

OBJECTS AND SUMMARY OF THE INVENTION

An object of the present invention is to provide a camera having a structural arrangement which gives an oblong and stable exposure frame for the half size frame for example, against the aforesaid structural arrangement taken over from the small-sized camera with a full size frame and the object mentioned above is attained by the camera wherein a film-take-up chamber and a film-supply chamber are arranged vertically with a lens located at the center thereof.

BRIEF DESCRIPTION OF THE DRAWINGS

FIG. 1 is a structural arrangement diagram that is obtained when the camera of the present invention is viewed from the front thereof.

FIG. 2 is a sectional view of the structural arrangement taken on line X—X of FIG. 1.

DETAILED DESCRIPTION

As shown in FIG. 1, a camera body is long in its horizontal direction in comparison with its length in vertical direction when the camera is held in ordinary photographing. A photographing lens 2 is provided on front side and near the center of the camera body when it is viewed from the front thereof. At the image-forming position behind photographing lens 2, there is provided a exposure frame 3 with which an oblong image of half size, that is 18×24 mm, is formed.

A film-supply chamber 4 that holds a film cartridge is provided under photographing lens 2 and there is provided a film-take-up chamber 5 that takes up film over photographing lens 2 and they are arranged so that the film may be advanced vertically. There is provided a release button (not illustrated) at the upper position on the left or front position on the left of the camera when it is viewed from the front thereof and there is provided a photometric section 6 for an automatic focusing and other camera functional elements on the right side of the camera where aforesaid film-supply chamber 4 and film-take-up chamber 5 do not exist.

Further, at the upper corner on the right side, there is provided a light-emitting section 7 for a strobo flash and a capacitor 8 for a strobo flash is provided on the right side.

A battery 9 for power source wherein a dry battery R6 or a dry battery R03 is used is arranged on the left side which is opposite to capacitor 8 about photographing lens 2.

Further, a finder 10 is arranged at the right side of the camera body.

On the camera with aforesaid structure, the film cartridge is loaded into the film-supply chamber and the film therein is taken up to film-take-up chamber 5 through exposure frame 3 where the exposure is made on the film when the release botton is pressed for photographing and then the film is taken up to film-take-up chamber 5 one frame at a time by the power of battery 9. In this case, as the film is advanced in the vertical direction in ordinary photographing, exposure frame 3 has a shape by which the oblong image of half size may be formed and therefore it is not necessary to photograph holding a camera in an unstable position for ordinary photographing.

The camera having the structural arrangement of the present invention has following advantages.

(1) The frame is half size is oblong for photographing and stable photographing may be made.

(2) Since the light-emitting section 7 for a strobo flash, the finder 10 and the photometric section 6 are arranged on the upper portion on the right side when viewed from the front of the camera, there is no fear that these items will be covered by the fingers when the release button is pressed. Incidentally, the positional relation between the light-emitting section 7 for a strobo flash and the photometric section 6, or between the light-emitting section 7 for a strobo flash and the finder 10 may be changed.

(3) Since the light-emitting section 7 for a strobo flash and the capacitor 8 are close each other, the length of the cord between them through which the big current flows can be short.

(4) Since the capacitor 8 and the battery 9 are arranged oppositely about the photographing lens 2, the operational balance of the camera functional elements around the photographing lens 2 on the camera is improved.

(5) On the dead spaces at the corner of the film-supply chamber 4 and the film-take-up chamber 5, there may be provided stepped portions 1a, 1b and 1c as shown in FIG. 2 or chamfered portions which may give the impression that the camera body is thin in its thickness and short in its height and may further improve the portability and operability thereof.

Incidentally, in the example, the film-take-up chamber 5 is located upwards and the film-supply chamber 4 is located downwards but the film-supply chamber 4 may be located upwards and the film-take-up chamber 5 may be located downwards.

I claim:

1. A camera comprising a camera body having a width that is longer than the height thereof; a photographing lens located at about the middle of the camera body both widthwise and heightwise; a film supply chamber and a film-take-up chamber arranged along a vertical axis in the direction of the height of the camera with one of said chambers positioned to one side of said photographing lens and the other of said chambers positioned to the other side thereof, said chambers being adapted to supply and take-up a roll of film having exposure frames thereon in the shape of a rectangle, such that the longer side of the rectangle is parallel to the width of the camera; and a plurality of functional elements within said camera body arranged for balance on both sides of said photographing lens in the widthwise direction of the camera body.

2. A camera according to claim 1 wherein a strobe flash and a view finder are arranged to one side of said photographing lens, in the direction of the width of the camera body, in an area wherein the film-supply chamber and the film-take-up chamber do not exist.

3. A camera according to claim 1 wherein a battery as a power source and a capacitor are arranged in the direction of the width of said camera body such that one is located on one side of said photographing lens and said chambers, and the other is located to the other side thereof.

4. A camera according to claim 1 wherein a photometric portion for automatic focusing is arranged to one side of the photographing lens and said chambers in the direction of the width of the camera body and in an area where said chambers do not exist.

5. A camera according to claim 2 wherein a photometric portion for automatic focusing is arranged vertically above the finder in the direction of the height of the camera body.

6. A camera according to claim 2, wherein said strobe flash is provided at an upper corner on said one side of said photographing lens and said chambers in the direction of the width of said camera body, wherein a capacitor for the strobe flash is provided below the finder, and a battery as a power source is arranged on the other side of said photographing lens and said chambers in the direction of the width of said camera body.

7. A camera according to claim 4 wherein the photometric portion for automatic focusing is arranged vertically above a finder in the direction of the height of said camera body.

* * * * *